United States Patent
Rietdorf et al.

(10) Patent No.: US 12,002,353 B2
(45) Date of Patent: Jun. 4, 2024

(54) METHOD AND SYSTEM FOR PROVIDING ENVIRONMENTAL DATA

(71) Applicant: Volkswagen Aktiengesellschaft, Wolfsburg (DE)

(72) Inventors: Stefan Rietdorf, Lohmar (DE); Nora Nortmann, Ingolstadt (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 395 days.

(21) Appl. No.: 17/416,718

(22) PCT Filed: Dec. 2, 2019

(86) PCT No.: PCT/EP2019/083354
§ 371 (c)(1),
(2) Date: Jun. 21, 2021

(87) PCT Pub. No.: WO2020/126447
PCT Pub. Date: Jun. 25, 2020

(65) Prior Publication Data
US 2022/0044554 A1    Feb. 10, 2022

(30) Foreign Application Priority Data

Dec. 21, 2018   (DE) ............. 10 2018 133 457.5

(51) Int. Cl.
| | |
|---|---|
| *G08G 1/01* | (2006.01) |
| *B60W 30/08* | (2012.01) |
| *G06V 20/58* | (2022.01) |

(52) U.S. Cl.
CPC ........ *G08G 1/0133* (2013.01); *B60W 30/08* (2013.01); *G06V 20/58* (2022.01); *G08G 1/0112* (2013.01);
(Continued)

(58) Field of Classification Search
CPC .. G08G 1/0133; G08G 1/0112; G08G 1/0141; G08G 1/167; G08G 1/166;
(Continued)

(56) References Cited

U.S. PATENT DOCUMENTS

| | | | |
|---|---|---|---|
| 7,974,748 B2 | 7/2011 | Goerick et al. | ............ 701/28 |
| 9,207,088 B2 | 12/2015 | Firl et al. | |

(Continued)

FOREIGN PATENT DOCUMENTS

| | | | | |
|---|---|---|---|---|
| CN | 1915725 A | 2/2007 | ............ | B60W 40/00 |
| CN | 102394008 A | 3/2012 | ............... | G08G 1/00 |

(Continued)

OTHER PUBLICATIONS

German Office Action, Application No. 102018133457.5, 6 pages, Nov. 29, 2019.

(Continued)

*Primary Examiner* — Tyler D Paige
(74) *Attorney, Agent, or Firm* — Slayden Grubert Beard PLLC (57) ABSTRACT

The invention relates to a method for providing environmental data wherein first environmental data are captured at a first time, objects being detected on the basis of the captured first environmental data, and object parameters being determined for each of the objects, wherein the object parameters are associated with the objects. In addition, a traffic situation is determined on the basis of the captured first environmental data, and filter criteria are determined according to the determined traffic situation. The filter criteria comprise prioritizations and predictions for the objects and the object parameters associated therewith. At a second time, second, updated environmental data are captured and transmission data are generated on the basis of the
(Continued)

second, updated environmental data and the filter criteria. The transmission data are output.

18 Claims, 4 Drawing Sheets

(52) U.S. Cl.
CPC ... *G08G 1/0141* (2013.01); *B60W 2554/4049* (2020.02)

(58) Field of Classification Search
CPC .................. G08G 1/165; B60W 30/08; B60W 2554/4049; G06V 20/58; G06V 20/56; B60R 2300/301; B60R 2300/302
See application file for complete search history.

(56) References Cited

U.S. PATENT DOCUMENTS

| | | | |
|---|---|---|---|
| 9,378,643 B2 | 6/2016 | Huelsen | |
| 9,800,492 B2 | 10/2017 | Stählin et al. | |
| 10,520,949 B2 | 12/2019 | Hasberg et al. | |
| 10,564,640 B2 | 2/2020 | Schwindt et al. | |
| 10,861,331 B2 | 12/2020 | Kawauchi et al. | |
| 2005/0021201 A1* | 1/2005 | Klotz | B60W 30/16 702/189 |
| 2011/0215744 A1 | 9/2011 | Kocher et al. | 318/400.07 |
| 2012/0161951 A1 | 6/2012 | Ito et al. | 340/435 |
| 2017/0124476 A1* | 5/2017 | Levinson | G01S 17/931 |
| 2018/0089518 A1 | 3/2018 | Yamashita et al. | |
| 2018/0090006 A1 | 3/2018 | Ikenouchi et al. | |
| 2019/0138007 A1* | 5/2019 | Baghsorkhi | G08G 1/16 |
| 2019/0205659 A1* | 7/2019 | Cuban | G06V 20/41 |
| 2019/0347821 A1* | 11/2019 | Stein | G06V 10/772 |

FOREIGN PATENT DOCUMENTS

| | | | |
|---|---|---|---|
| CN | 103650465 A | 3/2014 | ........... B60R 21/013 |
| CN | 103843044 A | 6/2014 | ............ G06F 17/30 |
| CN | 104296756 A | 1/2015 | ............ G01C 21/26 |
| CN | 108216249 A | 6/2018 | ............ B60W 30/18 |
| DE | 102008041549 A1 | 3/2010 | ............... H02P 6/18 |
| DE | 102008041679 A1 | 3/2010 | ............ B60W 40/02 |
| DE | 102014221888 A1 | 4/2016 | ............ B60W 40/02 |
| DE | 102014224665 A1 | 6/2016 | ............ B60R 16/02 |
| DE | 102015209186 A1 | 12/2016 | ............ B60W 40/02 |
| DE | 202017003594 U1 | 8/2017 | ............ H04L 12/28 |
| DE | 102017002089 A1 | 11/2017 | ............ B60R 16/02 |
| DE | 102018133457 A1 | 6/2020 | ............ B60W 30/08 |
| EP | 3330946 A1 | 6/2018 | ............... G06T 1/00 |
| WO | 2007/103180 A1 | 9/2007 | ............... G08G 1/09 |
| WO | 2017/167801 A1 | 10/2017 | ............... G05D 1/02 |
| WO | 2018/079623 A1 | 9/2019 | ............ B60R 11/02 |
| WO | 2020/126447 A1 | 6/2020 | ............... G08G 1/16 |

OTHER PUBLICATIONS

International Search Report and Written Opinion, Application No. PCT/EP2019/083354, 22 pages, Mar. 24, 2020.

* cited by examiner

METHOD AND SYSTEM FOR PROVIDING ENVIRONMENTAL DATA

CROSS-REFERENCE TO RELATED APPLICATIONS

This application claims priority to German Patent Application No. DE 10 2018 133 457.5, filed on Dec. 21, 2018 with the German Patent and Trademark Office. The contents of the aforesaid Patent Application are incorporated herein for all purposes.

TECHNICAL FIELD

The present invention relates to a method and a system for providing environmental data, for example in an environment of a vehicle, as well as a vehicle having such a system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern driver assist systems, the tasks thereof extending to the automatic control of various driving tasks of a vehicle, require a significant level of knowledge about the environment of the vehicle. Typically, a plurality of sensors which deliver diverse and comprehensive measuring data are provided. Ideally these measuring data are designed to be provided and processed in real time, in order to make correct driving decisions during the operation of the vehicle and to implement these decisions as rapidly as possible. In this context, the bandwidths for transmitting data and the computing capacities for the processing thereof are at their limits.

SUMMARY

An object exists for providing environmental data which permit a particularly flexible and efficient use of limited resources, for example of a vehicle.

The object is solved by a method and a system according to the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a method according to a first exemplary aspect, first environmental data are captured at a first time. Objects are detected on the basis of the captured first environmental data, and object parameters are determined for each of the objects, wherein the object parameters are associated with the objects. In addition, a traffic situation is determined on the basis of the captured first environmental data and filter criteria are determined according to the determined traffic situation. The filter criteria comprise prioritizations and predictions for the objects and the object parameters associated therewith. At a second time, second, updated environmental data are captured and transmission data are generated on the basis of the second, updated environmental data and the filter criteria. The transmission data are output.

This permits a particularly significant reduction in the volume of data to be transmitted and to be processed. In this context, the method is based on a bi-directional communication between the different levels of perception and processing of the environment.

The method may be carried out, for example, iteratively for a third time and optionally for further subsequent times. In this case, a current environmental data set is generated, for example on the basis of the first environmental data and the transmission data. New filter criteria are generated on the basis of this current environmental data set which may be updated in each time step and used in order to generate and output current transmission data in a subsequent time step. In other words, the capture of the first environmental data in the first time step is, in further time steps, replaced by the generation of the current environmental data set on the basis of the transmission data generated in the respectively previous time step and an environmental data set which was previously present. In this manner, changes in the environment may be taken into account. Moreover, a current transmission data set may also be generated by the environmental data being captured as in the first time step, and the method being started again from the beginning.

Conventional methods are generally based on a "feed-forward" approach. In this context, information from the environment is initially captured by means of sensors and forwarded as a whole to a unit for processing the data and for making decisions. Subsequently, information is transmitted to actuators which may carry out specific control commands. In the development of systems for undertaking complex tasks, namely in the case of autonomous vehicle travel, ever greater bandwidths and computing powers are required as a result.

However, the method discussed herein is based on a "feed-backward" approach, in which forecasts are generated and transmitted in the "backward" direction, namely to apparatuses at the level of the capture of environmental data. Conversely it is sufficient to transmit only deviations from the forecasts, which drastically reduces the total quantity of data. The data may thus be reduced to cases in which an object deviates from its anticipated behavior.

In contrast to known methods, in the present aspect the filtering takes place on the basis of an analysis of the current traffic situation, prioritizations for objects and object parameters being in turn derived therefrom. The observation of the objects, therefore, may be focused on the part of the environment which is relevant for the decision level in which, for example, driving functions of a vehicle are planned and controlled. However, the observation of other regions may be reduced in a flexible manner.

For example, it is possible to avoid the situation where a camera for observing the region located in front of a vehicle retransmits with each capture step the information that a vehicle traveling ahead at a specific speed in the capture region is located at a specific distance from the ego vehicle. This observation only becomes relevant again when the distance from the vehicle traveling ahead or its relative speed changes and, for example, measures have to be initiated in order to avoid a collision.

The capture of the environmental data is carried out in a manner known per se. Different sensors may be used individually or in combination, for example lidar, radar, ultrasound, light sensors, cameras for visible or infrared light, 3D cameras or apparatuses for position determination, such as for example receivers for signals from navigation satellites. The environmental data relate, for example, to the environment of an ego vehicle having a system for carrying out the method as well as features and states of the ego vehicle itself. The environment extends in this context to a spatial region in which objects may be present which are relevant for the evaluation of the driving situation of the vehicle and for determining suitable driving maneuvers. This region may be defined, for example, on the basis of a radius of 100 m around the ego vehicle.

The capture of the environmental data may also encompass that information is received from a driver assist system. The term "driver assist system" in this context is understood in broad terms and may encompass different systems associated with driving functions. In this context, the driving tasks are carried out partially or entirely automatically. For example, a driver assist system may output instructions to a driver or additionally assist the driver with the control; moreover individual features of the vehicle control may be undertaken or a fully autonomous driving of the vehicle may be carried out, in the case of a highest level of automation. For example, it is possible to evaluate data relative to upcoming automatic driving maneuvers which influence the environmental data to be anticipated. If braking is carried out, for example, the relative speeds of objects in the environment change according to the extent of the own speed change. Directional changes of the vehicle also change the perception of the environment by sensors of the vehicle.

The detection of objects and the determination of object parameters on the basis of the captured environmental data are also carried out in a manner known per se. For example, a pre-processing unit which pre-processes the environmental data captured by sensors is provided and as a result provides information about the detected objects and object parameters, for example for a computing unit or a driver assist system, which in turn determines an environment model and determines suitable driving maneuvers on the basis of these results. The degree of pre-processing provided may vary according to the computing power of a pre-processing unit. A pre-processing unit may be provided for an individual sensor or an individual module for detecting environmental data, but the environmental data captured by a plurality of such modules may also be pre-processed by one pre-processing unit.

During the detection, the environmental data are analyzed and data belonging to specific physical objects are determined. The detection creates, for example, the prerequisites for determining on the basis of the captured environmental data features for physical objects which are described within the context of the present teachings as object parameters.

In the detection of the objects, the type of object may be determined as an object parameter, for example a further road user, a physical item, a building or an element of vegetation. The determination may also be carried out in a more differentiated manner, for example by the road user being identified as a car, truck, vehicle combination and trailer, pedestrian or cyclist. Elements of a traffic infrastructure may be detected, namely traffic light systems, posts, road markings, pillars or features of traffic structures. On the basis of the identified types of objects, for example, it is possible to differentiate between static and dynamic objects. Moreover, specific motion models for different types of objects may be used, namely for taking into account the different speeds of vehicles and pedestrians.

The detected objects may also be identified as separate units within the environment, wherein the objects are provided with an identification number or a similar marking, for example, in order to identify them again at different times, namely across a plurality of measurements and namely to be able to determine a movement of an object. For example, an object with an identification "ID1" may be identified as a "car".

The object parameters are determined for individual objects and may refer to different physical features of the objects.

In some embodiments, the object parameter comprises a position, a distance, a speed, an acceleration, or a change in acceleration. As a result, particularly relevant parameters which are very important for assessing a dynamic driving situation are determined. The parameters may be additionally determined in a global coordinate system or in a relative coordinate system, namely relative to the position of the ego vehicle.

For example, it is determined for an object "ID1" that it is located frontally, at a specific distance in front of the own vehicle, and moves at a specific speed. It may also be determined that an acceleration is present which may change over time, for example when braking or a positive acceleration process is initiated.

In some embodiments, the object parameter comprises a direction. As a result, an orientation of an object in space may also be evaluated. For example, it may be determined that the front of a vehicle is oriented in a specific direction relative to the own vehicle.

In some embodiments, the object parameter comprises a color or a brightness. As a result, light signals which are widely used in road traffic may be evaluated. For example, light signals which indicate a braking or a planned directional change of a vehicle may be evaluated. Moreover, it is possible to evaluate signals from traffic light systems which, for example, permit or prohibit the passing of an intersection.

The method is designed, for example, iteratively. In this context, the second updated environmental data may be used for further carrying out the method instead of the first environmental data. Moreover, environment models may be generated and updated on the basis of the updated environmental data, wherein the transmission data are used in order to reduce the volume of data to be transmitted.

In some embodiments, the capture of the first and second environmental data, the determining of the object parameters for the objects and the generation of the transmission data are carried out by means of a capture unit. The determining of the traffic situation and the filter criteria take place by means of a computing unit. In this context, the first object parameters for the first time are transmitted from the capture unit to the computing unit, the filter criteria are transmitted from the computing unit to the capture unit and the transmission data for the second time are transmitted from the capture unit to the computing unit. The method in this context is used to optimize the data which is respectively to be transmitted.

For example, the capture unit may comprise a sensor for capturing the environmental data on the basis of a specific physical principle and also an integrated or separate control device for pre-processing the data thus captured. The tasks for processing the captured environmental data may be distributed differently to different units in further embodiments, for example for optimally using the computing power which is respectively available.

The method of the first exemplary aspect thus provides a coordinated cooperation between a sensor system or, respectively, the capture unit and the computing unit, which is namely configured as a control unit for the control of various driving functions of a vehicle.

In some embodiments, the volume of data of the transmission data relative to the volume of data of the first object parameters is reduced according to the filter criteria. For example, the transmission data comprise a subset of those object parameters which could be determined on the basis of the second updated environmental data. Thus, a significant reduction is achieved in the volume of data to be transmitted in all subsequent steps.

In some embodiments, a first environment model is determined on the basis of the captured first environmental data and a second, updated environment model is generated on the basis of the first environment model and the transmission data. As a result, a continuously updated environment model may be provided.

The method is based on an initial capture of the environment, on the basis of which a first environment model may be generated. The environment model comprises information about an environment, for example objects in this environment. This may include information about the type of the objects, their positions in relative or absolute coordinates, their speed, acceleration or a change in the acceleration, their orientation and specific states, namely lighting.

The environment model may be repeatedly updated in an iterative process in specific time steps, wherein for example the transmission data are used in order to update the object parameters associated with the objects. In other words, a current environmental data set which serves as a starting point for generating a current environment model is continuously generated at a third time and further subsequent times, for example on the basis of the transmission data that were last output. At the same time, for example, the filter criteria are also newly generated in each step with prioritizations and predictions and used for generating new transmission data on the basis of newly captured environmental data.

Moreover, for determining predictions, for example on the basis of the environment models, physical models may be used in order to predict the development of the environment model over time. To this end, assumptions are made, such as for example that specific object parameters of the objects do not change. For example, it may be assumed therefrom that the speeds and directions of movement of the objects do not change so that static objects continue to remain at their position in an absolute coordinate system, whilst the positions of moving objects may be calculated for subsequent times. The assumption may also be made that objects continue a specific current acceleration until the next time step, so that the speed and position may also be calculated for this next time step. These predictions are used for forming the filter criteria.

The predictions formed in the method refer to objects and the object parameters associated therewith. The predictions may be considered as hypotheses about the values of the object parameters, for example the hypothesis "value of the parameter remains constant in the next time step" or "value of the parameter adopts a specific value upon the next time step".

A plurality of predictions may be used for the same objects and associated object parameters, for example, in order to verify a plurality of hypotheses. A filtering may be carried out in a plurality of steps on the basis of this plurality of predictions, wherein by linking these filters, namely by means of a logical AND, OR, or EITHER-OR operation, the number of remaining elements may be reduced particularly effectively.

In some embodiments, the predictions for specific object parameters comprise information as to whether it is assumed that the object parameters remain constant for the updated environmental data. These constant object parameters do not always have to be repeatedly transmitted anew.

For example, it may be assumed that all objects move at constant speeds until the next time step, wherein in this case their position upon the next time step may also be forecast. With static objects, it may be assumed that their position does not change until the next time step, whilst with specific further objects it may be assumed that the speed continues to change uniformly during an acceleration.

The object parameters may be considered, for example, in different coordinate systems, for example in a static global coordinate system, in which for example a road is represented as immobile, or a vehicle system in which the own vehicle is assumed to be stationary, whilst for example static objects move counter to the direction of travel of the own vehicle. This may permit particularly simple filter criteria in which it is assumed, for example, that all objects are stationary in the global coordinate system, which is the case for road markings and elements of vegetation, for example. In a further example, it may be assumed that all objects are based in the vehicle system, i.e., they move at the same speed as the own vehicle. This may apply, for example, for vehicles in the environment of the own vehicle in heavy traffic.

In some embodiments, the predictions for specific object parameters comprise information about which changed values of the object parameters are anticipated for the updated environmental data. As a result, it may be specified precisely which values, which are anticipated according to an environment model, do not have to be repeatedly transmitted anew.

In this context, concrete values which are anticipated for an object parameter of an object are determined and transmitted. For example, a prediction is generated on the basis of a physical model, according to which a specific position of an object is anticipated after a time step if a constant speed is assumed. With such a prediction, the object parameter determined on the basis of the updated environmental data is only taken into account when generating the environmental data when it deviates from the prediction, for example when the deviation exceeds a specific threshold value. In this manner, an unnecessary transmission of object parameters may be dispensed with when its value has already been correctly predicted.

In some embodiments, the predictions for the object parameters are determined on the basis of a planned driving maneuver. As a result, beneficially the feedback effects of a driving maneuver, which is carried out for example partially autonomously or fully automatically, on the captured environmental data may be taken into account in order to avoid an unnecessary increase in the transmitted volume of data.

For example, driving maneuvers such as a planned acceleration, an overtaking procedure or a lane change necessarily lead to changing the perception of the environment relative to the vehicle. For example, the positions and speeds of the objects relative to the own vehicle are changed when this vehicle carries out such a driving maneuver. Information about the driving maneuver may be provided by driver assist systems which serve, for example, for assisting specific driving maneuvers or which may carry out a driving maneuver partially or fully automatically. Further instructions for driving maneuvers may also be evaluated, for example the actuation of an indicator, which typically indicates a directional change. The predictions may thus be generated such that, for example, it is specified for specific object parameters and specific objects that a specific value is anticipated therefor or that the current value remains constant.

In the method, a traffic situation which relates to the effects of the objects with specific object parameters on the journey and the driving options of the own vehicle is also determined.

In some embodiments, the transmission data comprise information about a deviation of captured object parameters from the predictions. For example, only the deviations between the measured and predicted values are transmitted, i.e., namely the differences between the values of the prediction and the actual measurement. The transmission data may be reduced thereby to the minimum quantity of data required.

The transmission data may thus permit a particularly simple updating of an environment model in that only the required adaptations are made to the specific object parameters. As a result, the quantity of data to be transmitted is minimized and a more rapid transmission is enabled.

In some embodiments, the determining of the traffic situation comprises a classification of types of driving maneuvers, configurations of vehicles to one another or traffic regulations. This permits the filter criteria, which are generated on the basis of the traffic situation, to be particularly well adapted to the respective context of the environment of the vehicle. The classification is made, for example, on the basis of the object parameters which are associated with the objects.

The determined traffic situation may relate, for example, to the relationship of the own vehicle to objects and, for example, further road users in the environment and as a result the boundary conditions dictated thereby for continuing the journey. The traffic situation may comprise, for example, information about the fact that a vehicle traveling ahead is located in front of the own vehicle in the direction of travel. In other examples, the traffic situation may relate to information about a lane used within a specific arrangement of travel lanes, vehicles traveling behind, further vehicles in adjacent lanes, oncoming vehicles or obstacles to a journey. They may also relate to traffic regulations, namely by traffic light systems or road signs, which specify rules for the onward journey.

The traffic situation may be determined in a manner known per se, for example on the basis of a driver assist system or a system for partial or full autonomous control, which analyses the captured environmental data and plans a driving maneuver for the own vehicle. Rule-based methods or machine learning may be used in order to carry out the classification and determination of the traffic situation.

In the present aspect, filter criteria are determined depending on the traffic situation. These criteria comprise rules for filtering the second, updated environmental data for the generating of transmission data. The filter criteria comprise, for example, information about conditions for whether specific data and object parameters for specific objects are to be transmitted. In order to define these criteria, prioritizations and predictions are used.

It is also specified by the prioritizations for specific objects and object parameters how important it is to always have highly accurate knowledge of the object parameters for the objects. For example, the prioritizations may define that specific object parameters for specific objects always have to be known as accurately as possible whilst in a different case they are less relevant.

For example, in a journey in heavy traffic it may be particularly important to monitor the distance from a vehicle traveling ahead in order to be able to react quickly to changes. The distance from a vehicle traveling behind, however, may be of lesser importance as long as no significant changes occur here or, for example, a collision is imminent. The speed of a vehicle traveling in heavy traffic in an adjacent lane may be evaluated as less important than the lateral distance which changes, for example, when the other vehicle swings out and may indicate an imminent collision.

The prioritizations are determined, for example, for each of the objects which are determined on the basis of the environmental data and each of the object parameters associated therewith. Moreover, specific prioritizations may apply for specific groups of objects, for example for objects in a specific spatial region relative to the position of the own vehicle.

In some embodiments, threshold values are associated with specific object parameters on the basis of the prioritizations, and when generating the transmission data information is rejected about such object parameters which deviate less than the threshold values from the respective prediction. As a result, it may be established for specific objects and object parameters how sensitively it is possible to react, for example, to changes of the specific parameters and how high the relevance is of specific objects and parameters for fulfilling a driver task.

Thus, the transmission data may already comprise in the above example information about a slight change in the distance from the vehicle traveling ahead or a smaller lateral deviation of the vehicle in the adjacent lane. At the same time, the transmission data may comprise a change in the lateral position of the vehicle traveling ahead only when it is a greater deviation relative to the prediction, as for example in the case of a change of lane.

The prioritizations may also comprise information about the sensors by which the environmental data for a specific object or a specific object parameter is to be captured. In other words, the filter criteria may be taken into account during the capture of the second, updated environmental data at the second time. For example, specific object parameters may be captured particularly well on the basis of data of a specific sensor type. Data which is not required from other sensors may be avoided, by these sensors not being activated or by the captured environmental data being filtered such that the data captured by the corresponding sensors are not taken into account. Additionally, the capture of the environmental data by different sensors may be set in a variable manner, namely in that a region, in which the capture takes place, is defined with a higher or lower temporal or spatial resolution. As a result, it may be avoided that unnecessary data are captured and which then have to be filtered or processed. Conversely, particularly rapid processing is achieved by the avoidance of such data.

In the present aspect, the transmission data are also output, for example, via an interface. The output may take place, for example, by transmitting to an environment determination unit which is designed to update or, respectively, to verify an environment model on the basis of the transmission data. The interface may be configured to be bi-directional and also serve for the transmission of filter criteria which are generated, for example, by the environment determination unit.

In a second exemplary aspect, a system for providing environmental data comprises a capture unit for capturing first environmental data at a first time and a pre-processing unit which is designed to detect objects on the basis of the captured first environmental data and to determine object parameters for each of the objects, wherein the object parameters are associated with the objects. The system also comprises a computing unit which is designed to also determine a traffic situation on the basis of the captured first environmental data and to determine filter criteria according to the determined traffic situation. In this context, the filter criteria comprise prioritizations and predictions for the objects and the object parameters associated therewith. The capture unit is also designed to capture second, updated environmental data at a second time. The pre-processing unit is also designed to generate transmission data on the basis of the second, updated environmental data and the filter criteria and to output the transmission data.

The system is configured, for example, to implement the above-described method.

In some embodiments of the system, the capture unit comprises a lidar, radar or ultrasound detector and/or a camera. Alternatively or additionally, other sensors or capture modules which are suitable for capturing environmental data on the basis of different measuring principles may be provided. Moreover, a position determining unit may be provided, for example on the basis of a global satellite navigation system or a map-based position determination. As a result, very different types of sensors may be used in a flexible manner.

The environmental data captured by a specific sensor or capture module may be processed in each case by a pre-processing unit or the environmental data captured by a plurality of sensors or capture modules are processed by a common pre-processing unit.

In some embodiments of the system, the pre-processing unit is comprised by the capture unit. In this context, the capture unit is designed to transmit the first object parameters for the first time and to transmit the transmission data for the second time to the computing unit. Moreover, the computing unit is designed to transmit the filter criteria to the capture unit. The system is thus designed such that the data transmitted during its operation are optimized and the bandwidths available are optimally utilized.

The pre-processing unit may be configured, for example, as a control device and may be an integral component of the capture unit. The pre-processing unit may also be configured as a separate unit, for example belonging to the capture unit. Moreover, during the pre-processing of the captured environmental data the computing tasks may be distributed to different units which, for example, are in some cases comprised by the capture unit and in other cases are configured separately therefrom.

In some embodiments, the capture unit is controlled on the basis of the prioritizations such that the updated environmental data are captured on the basis of a subset of different sensors of the capture unit. As a result, already during the capture of the environmental data it is possible to avoid irrelevant data being provided by specific sensors.

For example, a vehicle comprises a plurality of sensors which may be individually activated or deactivated according to the prioritizations, at least during the capture of environmental data for a specific object or a specific object parameter associated with the object. Moreover, the data captured by the sensors may be filtered such that the environmental data are not provided for specific objects and/or associated object parameters.

According to another exemplary aspect, a vehicle is provided that comprises a system according to the preceding aspect.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
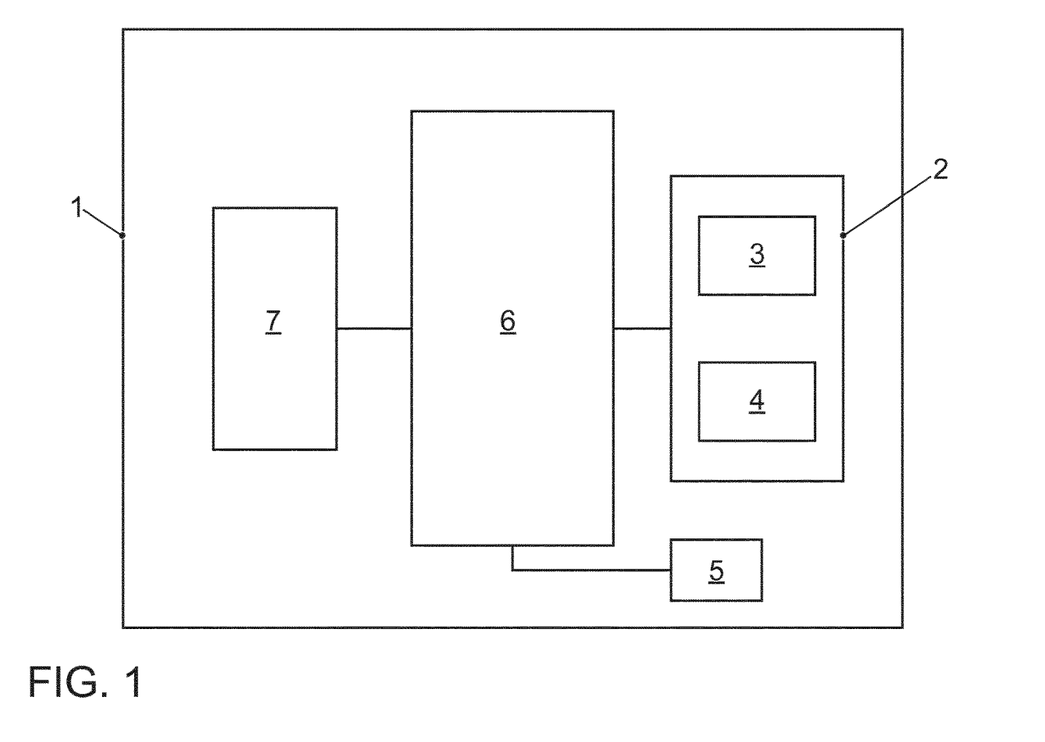
FIG. 1 shows an exemplary embodiment of the system.

The vehicle 1 comprises a position determining unit 5 which in the exemplary embodiment is based on a global satellite navigation system, for example the global positioning system GPS. In other exemplary embodiments, alternatively or additionally other position determining methods may also be used in a global or relative coordinate system, namely a landmark-based localization.

The vehicle 1 also comprises a capture unit 2 which in the exemplary embodiment comprises a camera 3 and a pre-processing unit 4. In the example, the pre-processing unit 4 is comprised as a pre-processing module by a control device for the camera 3, but it may be designed in practically any other manner. In other exemplary embodiments the capture unit 2 may alternatively or additionally comprise any sensor apparatuses, namely lidar or radar scanners, time-of-flight cameras, stereo cameras, infrared camera or ultrasound sensors. Further pre-processing units may be associated therewith.

The vehicle 1 additionally comprises a computing unit 6 to which the capture unit 2, the position determining unit 5 and a driver assist system 7 are coupled. The driver assist system 7 in the exemplary embodiments may be operated such that it has only a function assisting the driver of the vehicle 1, namely by means of outputting instructions or by means of assisting interventions in the vehicle control; it may also be operated such that the vehicle 1 is controlled partially or fully autonomously.

A first exemplary embodiment of the method is described with reference to FIGS. 2A to 2D. In this context, the discussion is based on a system which is constructed in a manner similar to the exemplary embodiment described above with reference to FIG. 1, and for which therefore the same reference numerals are used.

Figure 2A:
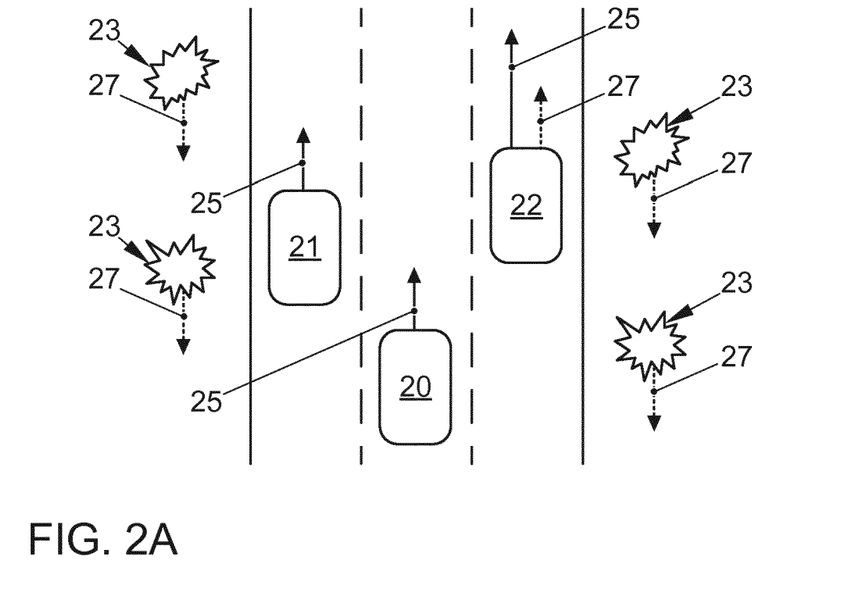
FIGS. 2A to 2D show a first exemplary embodiment of the method.

FIG. 2A shows a traffic situation in which an ego vehicle 20 is traveling in a middle lane of a road. A further vehicle 21 is located in a left-hand lane, and also a further vehicle 22 is located in the right-hand lane. Trees 23 are located on the edge of the road. The ego vehicle 20 and the vehicle 21 in the left-hand lane move at the same speed which is shown by the solid arrows 25 of equal length. The vehicle 22 in the right-hand lane moves at a greater speed, shown by the longer solid arrow 25.

The solid arrows 25 indicate the speeds of the vehicles 20, 21, 22 in the world system which is defined such that static objects, such as for example the road markings or trees 23, are stationary therein. Moreover, dashed arrows 27 show the respective speeds of the objects in the relative system of the ego vehicle 20. In this system, the ego vehicle 20 and the vehicle 21 in the left-hand lane are stationary, so that here no dashed arrows are shown. The static trees 23 move in this relative coordinate system counter to the direction of travel of the ego vehicle 20 which is also shown by dashed arrows 27. The speed of the vehicle 22 in the right-hand lane in the relative system of the ego vehicle 20 is reduced by the speed of the ego vehicle 20 which is shown by the length difference between the solid arrow 25 relative to the dashed arrow 27.

In the method, the vehicle 20 captures video data in the environment of the vehicle 20 by means of the camera 3 of the capture unit 2. For simplification, it is assumed here that the environmental data thus captured relate to the entire periphery of the vehicle 20 at a radius of approximately 100 m. In further exemplary embodiments, alternatively or additionally further sensors or modules for capturing environmental data may be provided which capture environmental data, for example, in different spatial regions around the vehicle 20.

The pre-processing unit 4 comprised by the capture unit 2 receives the video data recorded by the camera 3 and detects objects therein, in the exemplary embodiment the vehicle 21 in the left-hand lane, the vehicle 22 in the right-hand lane as well as the trees 23 adjacent to the road and the road marking on the road surface. The detection is carried out in a manner known per se, for example by means of image processing and pattern recognition. A classification of the objects is undertaken, wherein it is identified whether they are static or dynamic objects. For example, trees 23 may be identified as static objects, namely components of vegetation. Moreover, it may be identified that the further vehicles 21, 22 are cars and, as a result, dynamic objects.

Object parameters which in the exemplary embodiment are determined on the basis of the video data of the camera 3 are also associated with the identified objects. For each of the objects a position relative to the ego vehicle 20 is determined, in the exemplary embodiment defined by an angle and a distance. A speed relative to the vehicle 20 is also determined. Further environmental parameters may be an acceleration or a change in acceleration, a direction or a state of lighting. Together with the position and direction of the ego vehicle 20 determined by the position determining unit 5 in a global coordinate system, as well as further data available in the vehicle 20, for example about the speed thereof, the object parameters determined by the pre-processing unit 4 in a coordinate system relative to the ego vehicle 20 may also be transformed into a world coordinate system or vice-versa.

The data thus captured about objects and the object parameters associated with the objects are transmitted to the computing unit 6 which undertakes an initial determination of an initial environment model. In this context, the data are combined, forming a summary of information about the situation around the ego vehicle 20. The environment model is used, for example, by the driver assist system 7 in order to determine suitable driving maneuvers for the vehicle 20 and to output corresponding recommendations for a driver or to assist or carry out the driving maneuvers automatically.

The computing unit 6 determines a traffic situation on the basis of the environment model. To this end, a classification of the environment model is carried out, wherein in a manner known per se a configuration of objects with the specific object parameters in the environment of the vehicle 20 is associated with a specific traffic situation. This may relate, for example, to a role of the other vehicles 21, 22 and their relevance to the journey of the ego vehicle 20. For example, the specific traffic situation comprises an evaluation of the other vehicles 21, 22, according to whether they are located on the same lane as the ego vehicle 20, whether it is allowed to overtake them or whether they may represent obstacles.

Filter criteria, which comprise prioritizations and predictions for the objects and the object parameters associated therewith, are determined according to the specific traffic situation. In the exemplary embodiment, the filter criteria comprise, for example, the information that no changes are to be anticipated for the static trees 23 and the road markings by their own movement and that their speed in the relative system of the ego vehicle 20 is assumed to be substantially constant when the ego vehicle 20 moves at a constant speed in the lane. Moreover, the trees 23 are located away from the road, so that changes in the object parameters associated therewith are only important for a re-evaluation of the traffic situation when they are particularly significant changes, for example when it is identified that due to an incorrect detection it is indeed a dynamic object which is moving toward the road. Moreover, the filter criteria comprise, for example, the information that objects at the same speed as the ego vehicle 20 are of less relevance than other objects. In other words, the vehicle 21 in the left-hand lane may be assumed to be at a constant position relative to the ego vehicle 20 as long as it does not change its speed.

In the exemplary embodiment, the computing unit 6 also applies a physical model, which describes the objects in the environment model and in which conclusions may be drawn by extrapolation as to the specific values of the object parameters.

At a later time, the capture unit 2 captures again the environment of the ego vehicle 20. The pre-processing unit 4 in turn carries out the detection of the objects and the object parameters associated therewith, wherein the same objects are identified relative to the last capture. In other words, detections of the initial capture of the environment in a first time step are associated with updated detections of the second capture of the environment in a second time step. The prioritizations and predictions for the objects detected in the first time step, therefore, may be compared with the objects detected in the second time step. Subsequently, transmission data are generated and transmitted to the computing unit 6. A filtering of the data is carried out in order to reduce the extent thereof and the bandwidth required for the transmission. In this context, conditions specified by the filter criteria for the objects and the object parameters associated therewith are verified. Depending on whether the conditions are fulfilled, the corresponding data are comprised by the transmission data. Various filtering possibilities are described hereinafter by way of example.

Figure 2B:
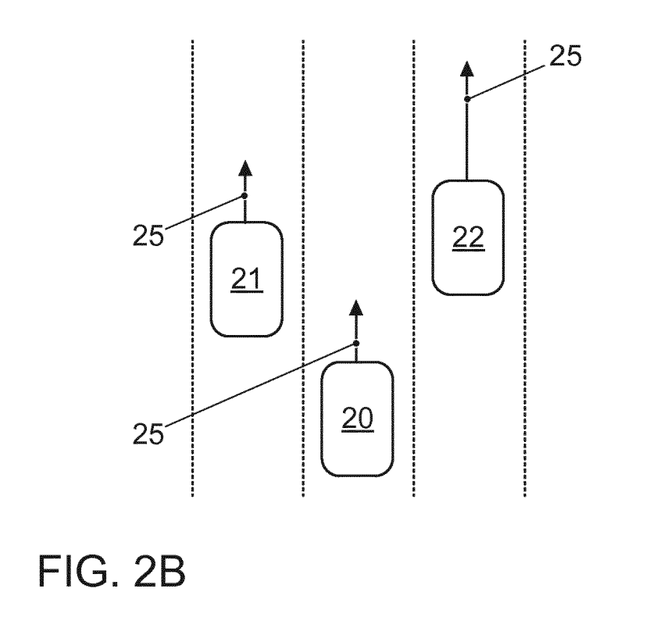

In the case shown in FIG. 2B, for the traffic situation which is shown in FIG. 2A, a filtering is carried out by using the prediction that all objects in the world system are stationary. In other words, all objects which have a speed of 0 relative to the world system are filtered out from the environmental data. In the exemplary embodiment these objects are the trees 23 which are thus no longer contained in FIG. 2B and the road markings which are shown in dashed lines for orientation.

Figure 2C:
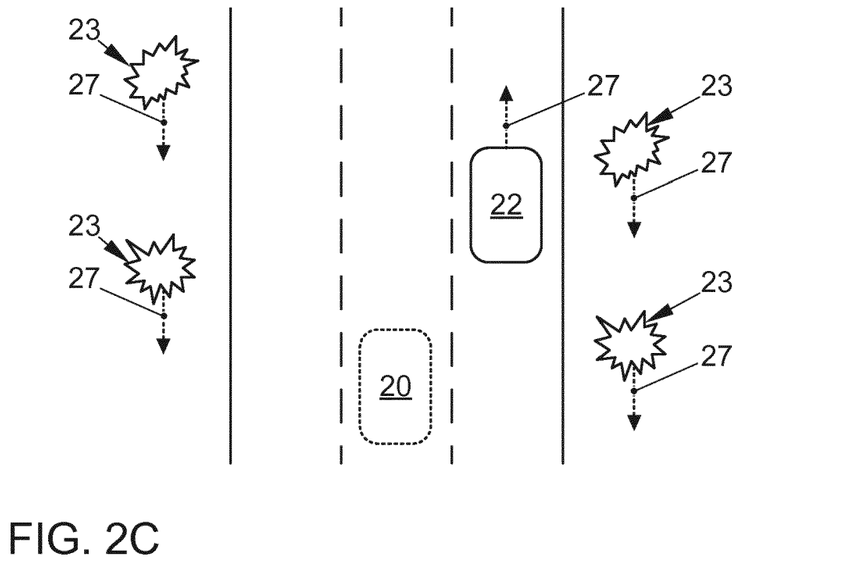

In the case shown in FIG. 2C, for the traffic situation which is shown in FIG. 2A, a filtering is carried out by using the prediction that all objects are stationary relative to the ego vehicle 20. In other words, all objects which have the same speed as the ego vehicle 20 relative to the world system are filtered out from the environmental data. In the exemplary embodiment this is the vehicle 21 in the left-hand lane which is thus no longer contained in FIG. 2C. The ego vehicle 20 is also shown for orientation.

Figure 2D:
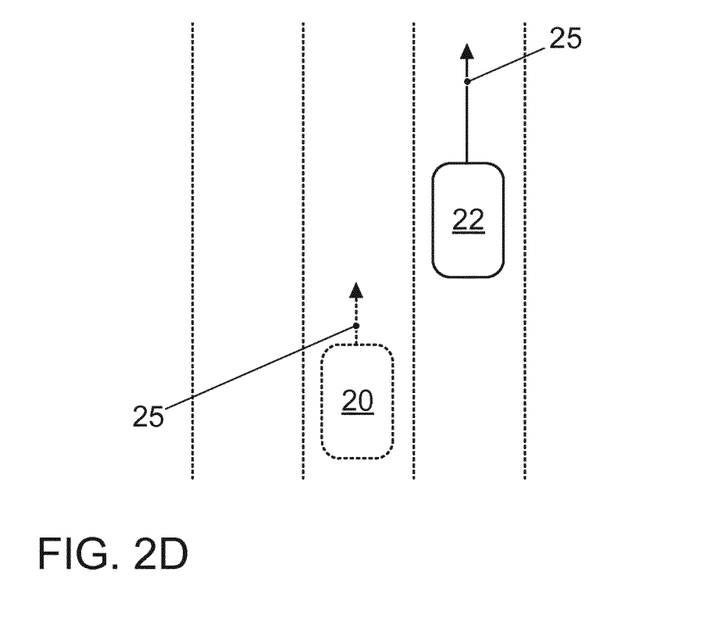

In the case shown in FIG. 2D, a logical AND operation of the filterings shown in FIGS. 2B and 2C is carried out. In other words, both objects which are stationary in the world system and also those objects which are stationary relative to the movement of the ego vehicle 20 are ignored. Only the vehicle 22 in the right-hand lane remains. The ego vehicle 20 and the road markings are still shown in dashed lines for orientation only.

Figure 3A:
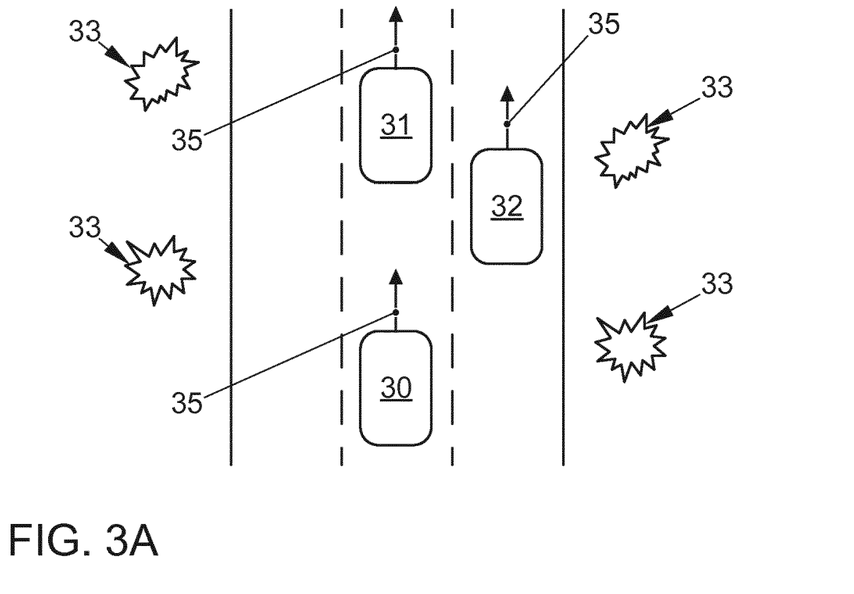
FIGS. 3A and 3B show a further exemplary embodiment of the method.
Figure 3B:
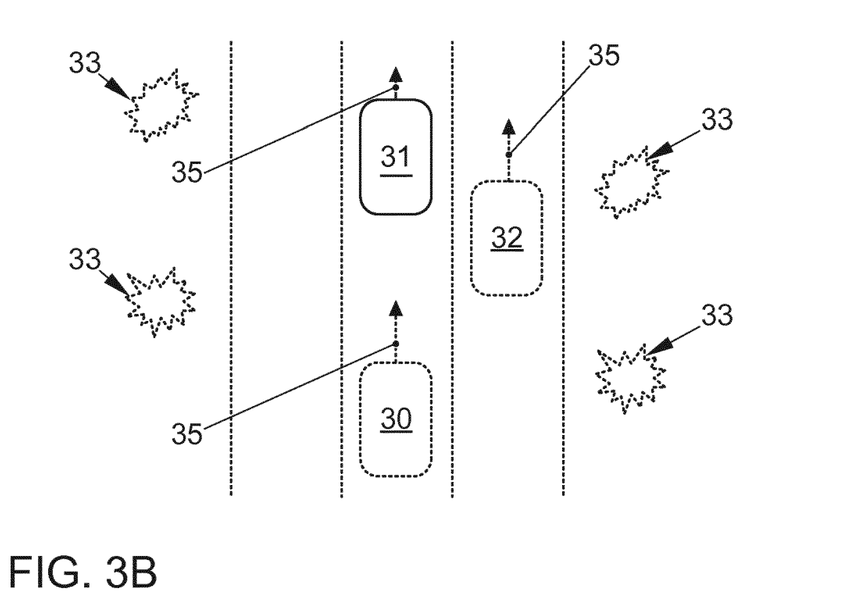

With reference to FIGS. 3A and 3B, a further exemplary embodiment of the method is described. In this context, the following descriptions are limited to the differences relative to the first exemplary embodiment of the method.

FIG. 3A shows a traffic situation in which an ego vehicle 30 is traveling in a middle lane of a road. In the direction of travel, a vehicle traveling ahead 31 is located in front of the ego vehicle 30 and a further vehicle 32 is located in the right-hand lane. The vehicles 30, 31, 32 travel at this time at the same speed which is indicated by the equal length of the arrows 35. In this exemplary embodiment the speeds refer to the world system.

The traffic situation is analyzed and a prioritization is determined such that for the object "vehicle traveling ahead 31" the object parameters "speed" and "distance" have a particularly high priority. However, the object parameters "speed" and "distance" for the object "vehicle in the right-hand lane 32" have a lower priority. Conversely, the object parameter "lateral position inside the lane" for the object "vehicle traveling ahead 31" is assigned a lower priority than for the object "vehicle in the right-hand lane 32".

During the prioritization, threshold values are associated with the object parameters for the objects and the filter criteria comprise the information that newly captured object parameters for the respective objects are to be comprised by the transmission data only when they deviate by more than the threshold value from a prediction for the respective value. Specifically, in the exemplary embodiment the higher priority of the distance for the vehicle traveling ahead 31 means that in comparison with the vehicle 32 in the right-hand lane a lower threshold value is fixed, said threshold value determining whether a deviation from the transmission data is to be comprised.

In the exemplary embodiment it is predicted that all objects move at constant speed or, respectively, are unchanged and stationary. In FIG. 3B a traffic situation at a later time is shown, in which the prediction that the movement is constant applies to all objects apart from the vehicle traveling ahead 31, i.e. all other objects 32, 33 move at constant speed or at least deviate no more than the respectively defined threshold values from their speed according to the prediction. The object 31 is thus the only one not shown in dashed lines and the shortened arrow 35 compared to FIG. 3A indicates that the speed of the vehicle traveling ahead 31 has reduced which also leads to a reduced distance from the ego vehicle 30. The changes in the speed and the distance between the ego vehicle 30 and the vehicle traveling ahead 31 exceed the threshold values therefor which are comprised by the filter criteria, so that information about these deviations from the prediction are to be comprised by the transmission data.

In a further situation, for example, it is possible to detect a change in the lateral position of the vehicle 32 in the right-hand lane which exceeds the threshold value determined therefor. This may be the case, for example, at the start of a lane change carried out by the vehicle 32 in the right-hand lane. Corresponding information about the changed lateral position are then taken into account in the transmission data.

The prioritizations of different objects and object parameters make it possible to differentiate between more or less relevant parameters. For example, an increased risk of a collision is present when the distance from the vehicle traveling ahead 31 reduces, rather than when, for example, the vehicle 32 in the right-hand lane brakes. The threshold values for the object parameters "speed" thus depend on the vehicles 31, 32 and their position relative to the ego vehicle 30, i.e. on the traffic situation. Conversely, the risk of a collision with the ego vehicle 30 increases when a change of the right-hand vehicle 32 to the middle lane occurs, whilst a change of lane of the vehicle traveling ahead 31 leads less directly to endangering the ego vehicle 30. Also in this case, therefore, the threshold values for the object parameter "lateral position" depend on the vehicles 31, 32 and the traffic situation.

In a further exemplary embodiment, a color or brightness are determined as object parameters. On the basis of this information, signals from traffic light systems or other road users are captured and taken into account when determining the traffic situation. Depending on their design, light signals of vehicles are in this context interpreted, for example, as an indicator for braking or an intention to change the direction of travel. The traffic situation comprises in this case, for example, a categorization "red/green traffic light ahead" or "adjacent vehicle wishes to change lane" or "vehicle traveling ahead is braking".

In a further exemplary embodiment, the driver assist system 7 generates an instruction for performing an autonomous driving maneuver or a request for carrying out a driving maneuver. The predictions for individual objects may be more accurately determined on the basis of the dynamics determined for the driving maneuver. If an acceleration of the ego vehicle 30 is planned, for example, it must be assumed that the relative speeds of all objects in the environment are correspondingly changed and that also their relative positions change according to the planned dynamics of the ego vehicle 30.

In a further exemplary embodiment, the method may alternatively or additionally be applied to an actuator system of the ego vehicle 30. In this context, the data transmitted from the actuator system to the computing unit 6 are filtered in a similar manner as is carried out in the above-described exemplary embodiments for the sensor system. In this case, the actuator system comprises apparatuses and modules for controlling the movement of the vehicle in the longitudinal and/or transverse direction. In this context, it may namely be a case of actuators for setting driving parameters, for example actuators for setting a steering angle or a drive power. It may also be a case of functions of a driver assist system 7 by which, for example, individual actuators are activated, for example according to an environment perception. For example, a lane departure warning system, a longitudinal control or a function for maintaining a speed according to the distance from a vehicle traveling ahead 31 are included in the actuator system. When an actuator system is activated, a specific result is typically assumed, for example traveling along a specific trajectory for overtaking or at a specific distance from other vehicles. When the environment model is updated, such trajectories may be used as predictions as long as the actuator system does not detect any deviations therefrom and provides these by means of transmission data. The predictions may then be correspondingly adapted.

LIST OF REFERENCE NUMERALS

1 Vehicle
2 Capture unit
3 Camera
4 Pre-processing unit
5 Position determining unit
6 Computing unit
7 Driver assist system
20 Ego vehicle
21 Object, further vehicle (left-hand lane)
22 Object, further vehicle (right-hand lane)
23 Object, tree
25 Arrow; speed (in world system)
27 Arrow; speed (in relative system)
30 Ego vehicle
31 Object, further vehicle (traveling ahead)
32 Object, further vehicle (right-hand lane)
33 Object, tree
35 Arrow; speed (in world system)

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for providing environmental data of a vehicle, comprising:
    capturing first environmental data at a first time using at least one sensor;
    detecting objects in the environment of the vehicle by analyzing the captured first environmental data;
    detecting object parameters for each of the objects, wherein the object parameters are associated with the objects, wherein the object parameters for a respective object include at least one of a position, a distance, a speed, an acceleration, or a change in acceleration of the respective object relative to the vehicle or other reference;
    determining a traffic situation by analyzing the captured first environmental data;
    determining filter criteria based on the determined traffic situation, wherein the filter criteria comprise at least predictions for respective object parameters associated with respective objects, wherein the prediction for a respective object parameter specifies whether the respective object parameter is static or dynamic;
    at a second time, capturing second environmental data using the at least one sensor;
    filtering the second environmental data using the determined filter criteria to reduce a bandwidth requirement for transmission, wherein the filtering comprises identifying, based on the second environmental data:
        a first subset of object parameters that match the respective predictions for the respective object parameters; and
        a second subset of object parameters that deviate from the respective predictions for the respective object parameters;
    generating transmission data associated with the second subset of object parameters but not the first subset of object parameters on the basis of the second environmental data;
    transmitting the transmission data to a processor; and
    controlling, by the processor, an autonomous driving operation of the vehicle based at least on the transmission data transmitted by the pre-processor.

2. The method of claim 1, wherein
    the capture of the first and second environmental data, the determining of the object parameters for the objects and the generating of the transmission data are performed by a capture unit including the at least one sensor and a pre-processor; and
    the determining of the traffic situation and the filter criteria is carried out by a processor, wherein
        the first object parameters for the first time are transmitted from the capture unit to the processor;
        the filter criteria are transmitted from the processor to the capture unit; and
        the transmission data for the second time are transmitted from the capture unit to the processor.

3. The method of claim 2, wherein the volume of data of the transmission data relative to the volume of data of the first object parameters is reduced according to the filter criteria.

4. The method of claim 3, further comprising:
    determining a first environment model on the basis of the captured first environmental data; and
    generating a second, updated environment model on the basis of the first environment model and the transmission data.

5. The method of claim 2, further comprising:
    determining a first environment model on the basis of the captured first environmental data; and
    generating a second, updated environment model on the basis of the first environment model and the transmission data.

6. The method of claim 1, further comprising:
    determining a first environment model on the basis of the captured first environmental data; and
    generating a second, updated environment model on the basis of the first environment model and the transmission data.

7. The method of claim 1, wherein the predictions for specific object parameters comprise information about which changed values of the object parameters are anticipated for the updated environmental data.

8. The method of claim 1, wherein the predictions for the object parameters are determined on the basis of a planned driving maneuver.

9. The method of claim 1, wherein the determining of the traffic situation comprises one or more of a classification of types of driving maneuvers, configurations of vehicles relative to one another, and traffic regulations.

10. The method of claim 1, wherein
threshold values are associated with specific object parameters on the basis of prioritizations associated with respective object parameters; and
determining a second subset of object parameters that deviate from the respective predictions for the respective object parameters comprises determining object parameters which deviate from their respective predictions by less than the respective threshold values from the respective predictions.

11. The method of claim 1, wherein
the capture of the first and second environmental data, the determining of the object parameters for the objects and the generating of the transmission data are performed by a capture unit including the at least one sensor and a pre-processor; and
the determining of the traffic situation and the filter criteria is carried out by a processor, wherein
the first object parameters for the first time are transmitted from the sensor to the processor;
the filter criteria are transmitted from the processor to the sensor; and
the transmission data for the second time are transmitted from the sensor to the processor.

12. The method of claim 1, further comprising:
determining a first environment model on the basis of the captured first environmental data; and
generating a second, updated environment model on the basis of the first environment model and the transmission data.

13. The method of claim 1, comprising determining a position of the vehicle using a receiver, configured for a global satellite navigation system, wherein the traffic situation is determined using the position of the vehicle.

14. A system for providing environmental data in a vehicle, comprising:
a sensor for capturing first environmental data at a first time;
a pre-processor which is configured to detect objects in the environment of the vehicle by analyzing the captured first environmental data and to determine object parameters for each of the objects, wherein the object parameters are associated with the objects, and wherein object parameters for a respective object include at least one of a position, a distance, a speed, an acceleration, or a change in acceleration of the respective object relative to the vehicle or other reference; and
a processor which is configured to determine a traffic situation on the basis of the captured first environmental data and to determine filter criteria according to the determined traffic situation;
wherein the filter criteria comprise at least predictions for respective object parameters associated with respective objects, wherein the prediction for a respective object parameter specifies whether the respective object parameter is static or dynamic;
wherein the sensor is configured to capture second environmental data at a second time and to filter the second environmental data using the determined filter criteria to reduce a bandwidth requirement for transmission, wherein the filtering comprises identifying, based on the second environmental data:
a first subset of object parameters that match the respective predictions for the respective object parameters; and
a second subset of object parameters that deviate from the respective predictions for the respective object parameters;
wherein the pre-processor is configured to generate transmission data associated with the second subset of object parameters but not the first subset of object parameters on the basis of the second environmental data and the filter criteria, and transmit the transmission data to the processor; and
wherein the processor is configured to control an autonomous driving operation of the vehicle based at least on the transmission data transmitted by the pre-processor.

15. The system of claim 14, wherein the sensor comprises a lidar, radar or ultrasonic detector, and/or a camera.

16. The system of claim 14, wherein the pre-processor is comprised by the sensor; wherein
the sensor is configured to transmit the first object parameters for the first time and to transmit the transmission data for the second time to the processor; and
the processor is configured to transmit the filter criteria to the sensor.

17. The system of claim 14, wherein the sensor is controlled on the basis of the prioritizations such that the updated environmental data are captured on the basis of a subset of different sensors of the sensor.

18. A vehicle having the system of claim 14.

* * * * *